United States Patent
Ephraim et al.

(10) Patent No.: US 8,897,749 B1
(45) Date of Patent: Nov. 25, 2014

(54) POLICY DECISIONS BASED ON SUBSCRIBER SPENDING LIMITS

(71) Applicant: Cellco Partnership, Arlington, VA (US)

(72) Inventors: Robert M. Ephraim, Bridgewater, NJ (US); Ho Y. Cheuk, Bridgewater, NJ (US); Violeta Cakulev, Millburn, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/890,620

(22) Filed: May 9, 2013

(51) Int. Cl.
*H04M 11/00* (2006.01)
*H04M 15/00* (2006.01)
(52) U.S. Cl.
CPC ............ *H04M 15/886* (2013.01); *H04M 15/66* (2013.01)
USPC ..................... 455/406; 455/414.1; 455/432.3; 455/422.1

(58) Field of Classification Search
CPC .... H04W 4/24; H04M 2215/32; H04M 15/00
USPC .......................... 455/406, 414.1, 432.3, 422.1
See application file for complete search history.

(56) References Cited

U.S. PATENT DOCUMENTS

| 2013/0084826 A1* | 4/2013 | Mo et al. ................. 455/406 |
| 2013/0246602 A1* | 9/2013 | Pandya et al. ............ 709/223 |

* cited by examiner

*Primary Examiner* — Nghi H Ly

(57) ABSTRACT

A policy and charging rules function node of a network may receive from the network an indication of an element of user equipment connecting to the network, query a subscription profile repository to receive a subscriber profile associated with the user equipment, the subscriber profile including indicators used in the selection of subscriber policies associated with the subscriber, and create a spending limit session based on the subscriber profile without waiting to receive a request from the user equipment for data services. The node may receive the request for data services from the element of user equipment, identify the spending limit session specifically corresponding to the user equipment, and respond to the request according to spending limit rules of the spending limit session associated with the element of user equipment. The node may also respond to the request according to default spending limit rules without waiting for creation of the spending limit session.

20 Claims, 6 Drawing Sheets

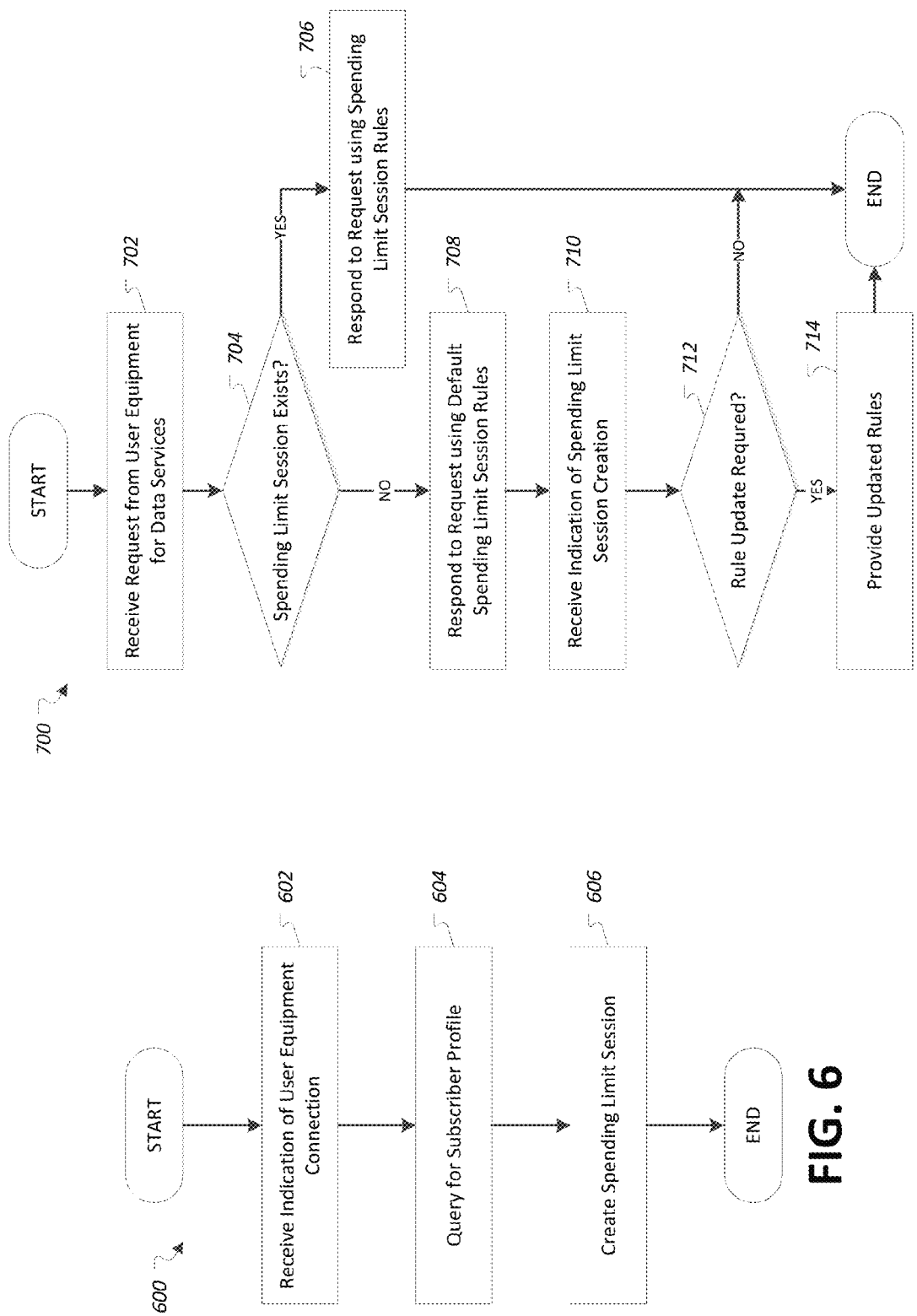

POLICY DECISIONS BASED ON SUBSCRIBER SPENDING LIMITS

BACKGROUND

A network service provider may monitor various metrics related to the performance of a communications networks. For instance, network service providers may monitor bandwidth utilization, packet drop statistics, and initial connection time wait, as some examples. Typical values for these performance metrics may be referred to as a performance baseline. By monitoring and recording these performance metrics, the network service provider may identify network problems, as well as identify functional aspects of the communications network that may be improved.

BRIEF DESCRIPTION OF THE DRAWINGS

FIG. 6 illustrates an exemplary process for creating a spending limit session for providing charged data services to user equipment.

FIG. 7 illustrates an exemplary process for utilizing a spending limit session for providing charged data services to user equipment.

DETAILED DESCRIPTION

Figure 1:
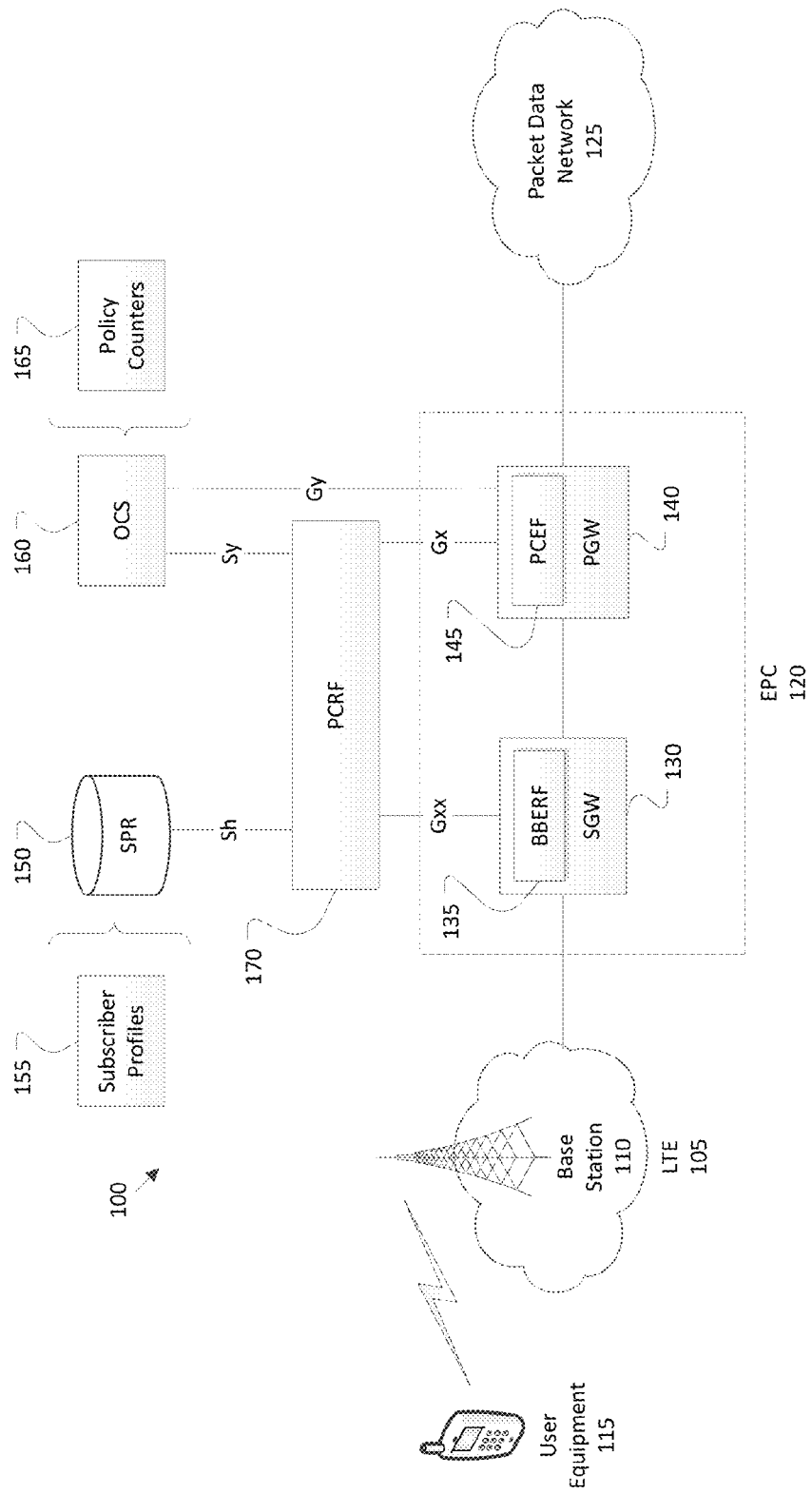
FIG. 1 illustrates an exemplary system for providing charged network services.

Policy counters are a mechanism by which an online charging system (OCS) of a communications network may track usage applicable to billing for a network subscriber. For instance, the OCS may maintain policy counters descriptive of subscriber network bandwidth usage or connection duration. A subscription profile repository (SPR) may include subscriber profiles that include indicators that allow a policy and charging rules function node (PCRF) of a network to determine whether a spending limit session (e.g., Sy session) is needed for the subscriber, and, if so which spending limit session dependent policies should be used for data sessions of the subscriber. The determined policies may be indicative of how to handle subscriber data flows, such as based on policy counter values received from the OCS that are indicative of how much of a subscriber's data allowance that the subscriber has consumed. The PCRF may be configured to send a spending limit request to the OCS to indicate policy counters for which the PCRF should receive status notifications, receive the spending limits associated with the subscriber, receive status notification values from the requested policy counters maintained in the OCS, and make policy decisions according to the received information. These systems may require the subscriber profile information from the SPR to make connection determinations, thereby blocking on requests to the SPR, with negative effect on performance baselines such as request response time.

An improved system may make policy decisions based on subscriber spending limits in a way that does not impact these performance baselines. The system may utilize a single "spending limit session" that begins automatically upon establishment of an initial packet data connection from an item of user equipment, where the spending limit session is maintained until a last packet data connection of the user equipment has been terminated. Thus, upon receipt of a first request for data services by the user equipment, in many cases the spending limits associated with the subscriber may already be received by the PCRF and be available for use in policy determinations. Moreover, in cases in which the spending limits associated with the subscriber have not yet been received, the PCRF may utilize default spending limits values to perform an initial policy determination, potentially followed up by any necessary corrections to the determination upon later receipt of the actual subscriber information. By way of these enhancements, policy decisions may be performed without having to synchronously wait or block on subscriber spending limit information, thereby improving performance baselines for user equipment service requests.

Fourth Generation (4G) wireless networks, as defined by the 3rd Generation Partnership Project (3GPP) standardization, are used herein to facilitate explanation of the spending limit sessions. Nevertheless, the disclosed examples are intended to be illustrative, not limiting, and the spending limit sessions may be applied to other types of packet-switched and/or wireless networks for which receipt of subscriber information may block connection requests.

FIG. 1 illustrates an exemplary system 100 for providing charged network services. The system 100 may include a long term evolution (LTE) network 105 having one or more base stations 110, where the base stations 110 may be in selective communication with one or more elements of user equipment 115. The EPC 120 may be in communications with the base stations 110 and a packet data network 125, and may serve as a gateway providing communications services of the packet data network 125 to the user equipment 115. To perform the gateway functions, the EPC 120 may include a serving gateway (SGW) 130 and a packet data network (PDN) gateway (PGW) 140. The system 100 may further include a policy and charging rule function node (PCRF) 170 of an Internet Protocol (IP) Multimedia Subsystem (IMS) in communication with a subscription profile repository (SPR) 150 maintaining subscriber profiles 155, an online charging system (OCS) 160 maintaining policy counter 165 information, a bearer binding and event reporting function (BBERF) 135 of the SGW 130, and a policy and charging enforcement function (PCEF) 145 of the PGW 140. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

LTE networks 105 are a growing standard in mobile network technology, including enhancements over earlier global system for mobile communications (GSM), enhanced data for global evolution (EDGE) and universal mobile telecommunications system (UTMS) network technologies. An LTE network 105 may provide downlink peak rates on the order of 100 Mbit/s, uplink rates on the order of 50 Mbit/s and radio access network (RAN) round-trip times on the order of 10 milliseconds. The LTE network 105 may include one or more base stations 110, such as eNode B (eNB) nodes, which may combine functionality of base station and radio access controllers (RNC) of 2G or 3G radio access networks. The base stations 110 may accordingly support the LTE network 105 air interface and may include functions for radio resource control, user plane ciphering and packet data convergence protocol (PDCP).

The base station or stations 110 of the LTE network 105 may provide communications services to one or more pieces of user equipment 115. User equipment 115 may include any device or devices configured to be operated by one or more users, such as a cellular telephone, laptop computer, tablet computing device, or personal digital assistant, among other exemplary devices. In addition to network functionality, user equipment 115 may include one or more components capable of receiving input such as voice and data entry from a user, and providing output to the user such as audible and/or visual output.

The EPC 120 may be an Internet Protocol (IP) network and may be substantially packet-switched. Thus, services such as voice (e.g., voice over LTE) and Internet may accordingly be provided to the user equipment 115 as packet-switched communications via the packet data network 125 by way of the EPC 120. The EPC 120 may further charge a subscriber associated with the user equipment 115 for use of provided data services and ensure that particular quality of service (QoS) standards are met.

The SGW 130 may be configured to operate as a gateway between the EPC 120 and the LTE network 105, and may provide connectivity for user equipment 115 data entering the EPC 120 as well as management of mobility of user equipment 115 among the base stations 110. While only one SGW 130 is illustrated, in many examples the EPC 120 may include multiple SGWs 130 in communication with various base stations 110 of the LTE network 105. The SGW 130 may also include a bearer binding and event reporting function (BBERF) 135 configured to apply QoS rules to service data flows (e.g., packet flows from user equipment 115 of a particular service type) and binding of the service data flows to access bearers in the bearer-plane.

The PGW 140 may be configured to operate as the gateway between the EPC 120 and the packet data network 125, and may provide connectivity for user equipment 115 data between the EPC 120 and the packet data network 125. The PGW 140 may include a PCEF 145 that enforces policy and charging control (PCC) rules for the service data flows. PCC rules may include, for example, information sufficient to identify user sessions and to apply policy control and charging to the identified flows.

The SPR 150 may be configured to store and retrieve QoS and charging subscription policies associated with subscribers or user equipment 115 connected to the system 100. The SPR 150 may accordingly store subscriber profiles 155 including subscriber identifiers and indications of subscription information associated with each subscriber identifier, such as indicators that may be used to determine whether a spending limit session (e.g., Sy session) is needed for the subscriber, and, if so which spending limit session dependent policies should be used for data sessions of the subscriber. The determined policies may be indicative of how to handle subscriber data flows based on policy counter status information. The policy counter status information may be based on factors such as how much of the subscriber's monthly data allowance (e.g., in terms of money, volume, duration, etc.) the subscriber may have consumed. The policies may include throttling actions that may be performed on subscriber data flows according to the subscriber reaching subscriber spending limits. In some examples the SPR 150 may also be integrated with a home subscriber server database configured to store further user information and profiles to facilitate multimedia services such as SIP calling functionality.

The OCS 160 may be configured to track spending in the form of policy counter 165 status for each subscriber or subscription. Policy counters 165 may include various mechanisms of the OCS 160 that may be used to track spending applicable to a subscriber. The OCS 160 may be further configured to report the policy counter 165 status values for the subscriber when requested to the PCRF 170 when a policy counter 165 status changes (e.g., exceeds a threshold value of usage), and report the change to the PCRF 170.

The PCRF 170 may be configured to make traffic policing and other policy and charging control decisions for data sent to and received by the user equipment 115. The PCRF 170 may be configured to take into account spending limits when making the policy determinations. Accordingly, the PCRF 170 may be configured to request subscriber profiles 155 from the SPR 150 and policy counter 165 status information from the OCS 160 to make the policy determinations. The PCRF 170 may be further configured to perform additional control of the policy counter status information, such as to cancel, reset, or otherwise control spending limit reporting.

Based on the policy determinations, the PCRF 170 may be further configured to provide charging and QoS rules to the PCEF 145 and QoS rules to the bearer binding and event reporting function (BBERF) 135 for enforcement. Exemplary policy enforcement actions may include one or more of dropping a connection that violates a policy or QoS rule, delaying the connection, or downgrading the connection (e.g., limiting a bandwidth rate of a connection associated with a subscriber exceeding a usage threshold of a subscriber profile 155).

Figure 2:
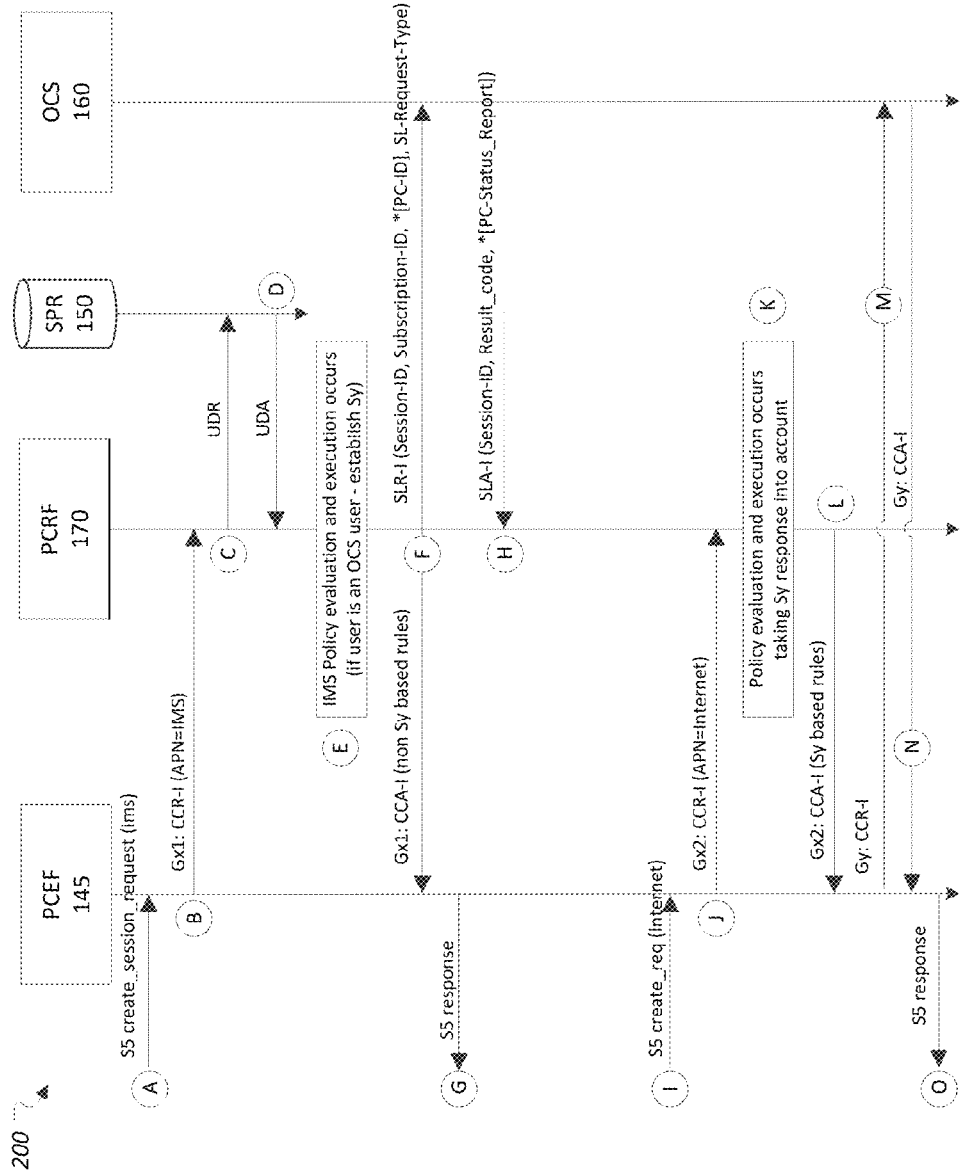
FIG. 2 illustrates an exemplary signaling diagram of the system for creation of a spending limit session that is active before processing a user request for network services.

FIG. 2 illustrates an exemplary signaling diagram 200 of the system 100 for creation of a spending limit session that is active before processing a user request for network services. Creation of the exemplary spending limit session may be triggered by user equipment 115 connection to the network (e.g., an IMS attachment), where the spending limit session (in this example Sy session) may be created for those subscribers whose subscriber profiles 155 indicate that they are OCS 160 subscribers. This determination may be performed by sending an initial spending limit request PCRF 170 message to the OCS 160 while establishing an initial PDN connection (e.g., IMS PDN). The single spending limit session for an OCS 160 subscriber may begin upon establishment of the initial PDN connection (e.g., to the IMS PDN), may be available to handle later user requests for data services (e.g., according to a created Internet PDN), and may end when the last PDN connection is terminated applicable to any PDN (e.g., according to a determination by the SGW 130 that no PDN connections remain to the attached user equipment 115). The Diameter protocol for authentication, authorization, and accounting is utilized in the examples below, but it should be noted that use of other protocols may be possible (e.g., the remote authentication dial in user service (RADIUS) protocol as one example).

More specifically, with respect to the diagram 200 at index (A), an IMS S5 create session request may be received by the PCEF 145 of the PGW 140. For example, an item of user equipment 115 may send an attach request to a base station 110 of the LTE network 105, which may forward the request to the EPC 120 to generate the create session request message directed to the PGW 140.

At index (B), the PCEF 145 may send a credit control request initiate (CCR-I) message over the Gx interface to the PCRF 170. CCR messages may be used to request a credit authorization for use of a particular service, and the Gx interface may be configured to exchange policy decision information between the PCEF 145 and the PCRF 170 (e.g., over the Diameter protocol). Accordingly, the Gx interface may provide for receiving requests from user equipment 115 for application or service requests in the form of CCRs. The CCR message may include subscriber information indicative of the identity of the user equipment 115 (e.g., mobile station international subscriber directory number (MSISDN), international mobile subscriber identity (IMSI), etc.) originating the request sequence.

At index (C), the PCRF 170 may send a user data request (UDR) message to the SPR 150 to request a subscriber profile 155 associated with the identity of the user equipment 115. For example, the UDR may be sent over an Sh interface between the PCRF 170 and the SPR 150 configured to facilitate the requesting of subscriber profile 155 or other subscription data, as well as for notification of the PCRF 170 of subscription data updates. At index (D), the PCRF 170 may receive a user data answer (UDA) response from the SPR 150 including the requested subscriber profile 155 (e.g., over the Sh interface). At index (E), based on the subscriber profile 155 the PCRF 170 may perform policy evaluation and execution for the subscriber associated with the user equipment 115 making the connection.

At index (F), the PCRF 170 may send a credit control answer initiate (CCA-I) response over the Gx interface to the PCEF 145, and substantially in parallel may send a spending limit request (SLR)-I to the OCS 160. CCA messages are sent in response to CCR messages (such as the CCR message sent at index (B)), and are used to provides responses to requests for credit authorization for use of a particular service (e.g., whether or not the request has been granted). With respect to the spending limit request, it should be noted that use of the SLR to the OCS 160 may be conditional on the contents of the subscriber's profile 155 being received from the SPR 150. For example, the SLR may only be sent for subscribers whose subscriber profiles 155 indicate the use of OCS 160 functionality.

At index (G), the PCEF 145 returns an S5 create session response back to the PGW 140 responsive to receipt of the CCA-I response. At index (H), a spending limit response or answer (SLA) may be received by the PCRF 170 (i.e., for subscribers that use the OCS 160). The Sy session may thus be created via the SLR/SLA exchange, regardless of whether any further user requests for services are made. Once created, the Sy session may be used to perform spending limit reporting from the OCS 160 to the PCEF 145 using the policy counters 165 of the OCS 160. The Sy session accordingly enables transfer of status information relating to subscriber spending between the OCS 160 and the PCRF 170 (e.g., requests for policy counter status reporting from the PCRF 170 to the OCS 160, notifications of policy counter 165 status changes from the OCS 160 to the PCRF 170, cancellations of policy counter 165 status reporting from the PCRF 170 to the OCS 160, etc.). As a specific example, if a daily spending limit for a subscriber is reached, the OCS 160 may inform the PCEF 145 via the Sy session of a policy counter 165 status change indicative of the daily spending limit being reached. As the Sy session may be per-OSC 160 subscriber and not per access point, the spending limit request message may not include an access point name (APN).

Further signaling may be triggered by user equipment 115 attachment to an Internet PDN (or to other PDNs subject to OCS 160, e.g., a control function PDN). For example, as illustrated at index (I), an S5 create session request Internet message may be received by the PGW 140 indicative of a user equipment 115 request for Internet services. At index (J), the PCEF 145 may send an Internet credit control request (CCR) message over the Gx interface to the PCRF 170. At index (K), the PCRF 170 may perform policy evaluation and execution taking the already active spending limit session into account. Accordingly, as the subscriber profile 155 spending limits have already been received by the PCRF 170, the PCRF 170 may perform the policy evaluation without blocking on requests to the SPR 150 or on other aspects of the creation of the Sy session. At index (L), PCRF 170 may send a CCA-I response over the Gx interface to the PCEF 145 responsive to the spending limit session and including Sy session-based PCC rules.

At index (M), the PCEF 145 sends a CCR-I message over the Gy interface to the OCS 160. The Gy interface may be used for reporting and charging functionality, such as to be used by the PCEF 145 to retrieve policy counter 165 information for the subscriber. At index (N), the OCS 160 receives a response to the CCR-I message over the Gy interface. At index (0), the PCEF 145 returns an S5 create session response back to the PGW 140 responsive to receipt of the CCA-I response.

Figure 3:
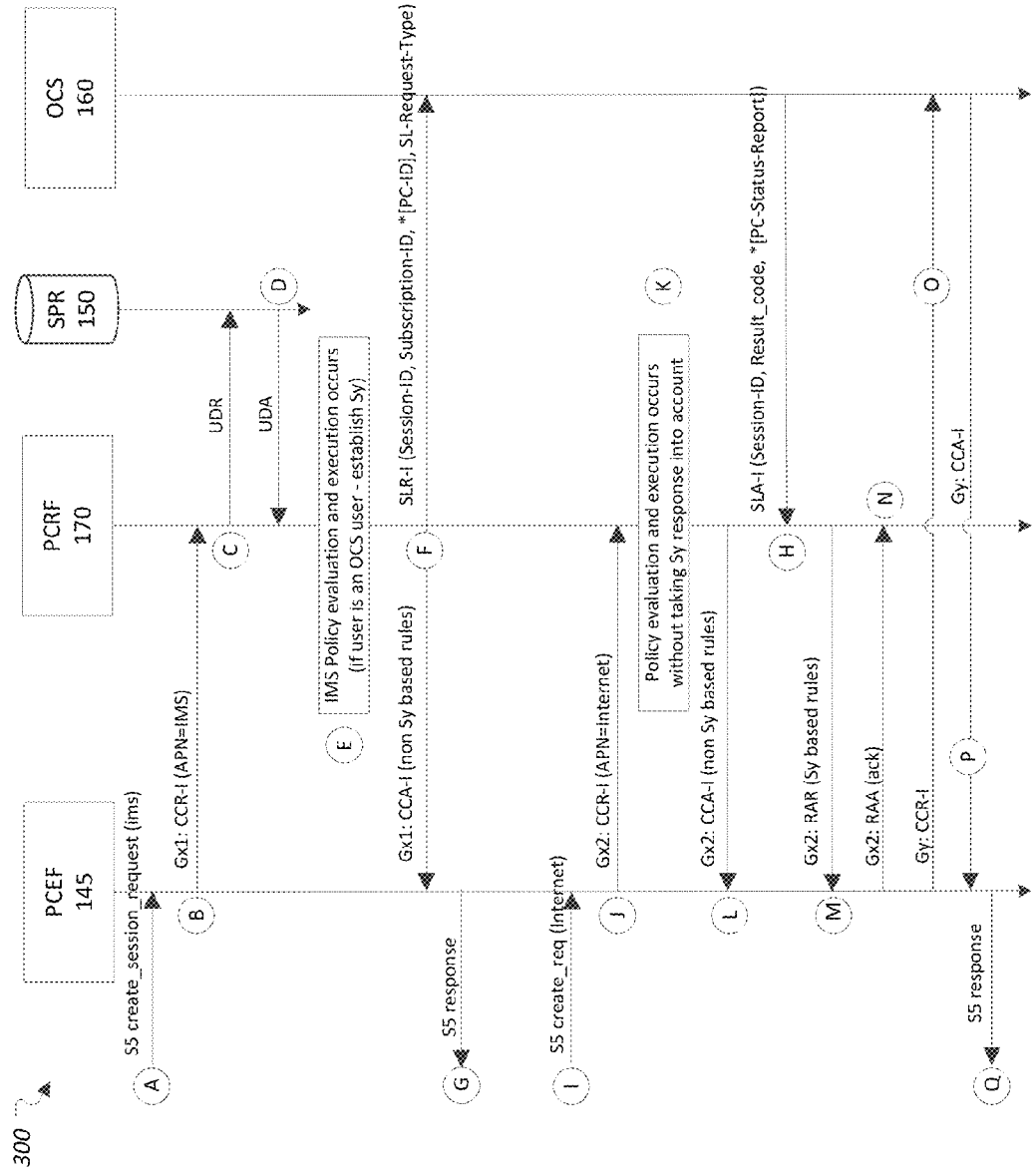
FIG. 3 illustrates an exemplary signaling diagram of the system for creation of a spending limit session that is not active before processing a user request for network services.

FIG. 3 illustrates an exemplary signaling diagram 300 of the system 100 for creation of a spending limit session that is not active before processing a user request for network services. As with the diagram 200, creation of the exemplary spending limit session may be triggered by user equipment 115 IMS attachment as described above with respect to indices (A) through (F). However, as compared to the scenario in diagram 200, the response to the spending limit request (SLR)-I to the OCS 160 in diagram 300 at index (H) may not be received until after receipt of the S5 create_session_request Internet message at index (I) indicative of a user equipment 115 request for Internet or other network services.

Thus, at index (J), the PCEF 145 may send an Internet credit control request (CCR) message over the Gx interface to the PCRF 170, but at index (K), because there is no spending limit session, the PCRF 170 is unable to perform policy evaluation and execution using the spending limit session for the subscriber. Nevertheless, to allow processing of the user request to proceed, the PCRF 170 may perform the policy evaluation and execution using default spending limit session information. Thus default information may, for example, include relatively unrestricted policies that generally allow connections using criteria indicative of substantial use remaining and are not specific to the user equipment. Such permissive defaults may be used, for example, because most users are within their policy limits, so a policy that generally allows requests is likely to be correct in the majority of cases. Thus, despite the subscriber profile 155 spending limits not having been received by the PCRF 170, the PCRF 170 may perform the policy evaluation using the aforementioned relatively unrestrictive defaults and without blocking on requests to the SPR 150. At index (L), PCRF 170 sends a CCA-I response over the Gx interface to the PCEF 145 indicative of the default PCC rules.

At index (H) upon receipt of the SLA from the OCS 160, a Sy session may be created. Moreover, if desired to correct any differences in the actual spending limits as compared to the defaults, at index (M) the PCRF 170 may send a re-authorize request (RAR) message to the PCEF 145 including the new policy information according to the received SLA. For instance, the RAR message may include updated policy information such as PCC rules indicative of a lower spending limit for the subscriber than that of the default rules. A RAA message may be sent in response to the RAR message, and may inform the PCRF 170 sender of the RAR message of the disposition of the re-authorize request. For example, the RAA may indicate whether the PCEF 145 has successfully executed the new PCC rules delivered through the RAR message. At index (N) the PCEF 145 may further provide a re-authorize answer (RAA) message to the PCRF 170 indicative of any re-authorization action that may have been taken.

Similar to as discussed above with respect to diagram 200, at index (O), the PCEF 145 sends a CCR-I message over the Gy interface to the OCS 160, at index (P), the OCS 160 receives a response to the CCR-I message over the Gy interface, and at index (Q), the PCEF 145 returns an S5 create session response back to the PGW 140 responsive to the CCA-I response.

Thus, as illustrated in diagrams 200 and 300, creation of the exemplary spending limit session may be triggered early by user equipment 115 IMS attachment, thereby allowing user requests for services to be handled without blocking on receipt of subscriber information, regardless of whether the spending limit session is active before or after the initial receipt of a user request for services. Because blocking on user requests is eliminated, the system 100 may therefore improve response time and related performance metrics.

Spending limit sessions may at certain times no longer be required and may be terminated to preserve network resources. For example, an Sy session may be terminated by request of the PCRF 170 or the OCS 160. One method of terminating the spending limit session by the OCS 160 may be performed by using a session notification request (SNR) message. SNR messages may be used to report policy counter changes from the OCS 160 to the PCRF 170. Moreover, when used as an audit message in this method, the SNR may be sent from the OCS 160 to the PCRF 170 without containing a policy counter 165 status report. Once such a message is received by the PCRF 170, two cases may occur depending on whether or not the PCRF 170 determines it has an active Sy session associated with the subscriber user equipment 115.

Figures 4, 5:
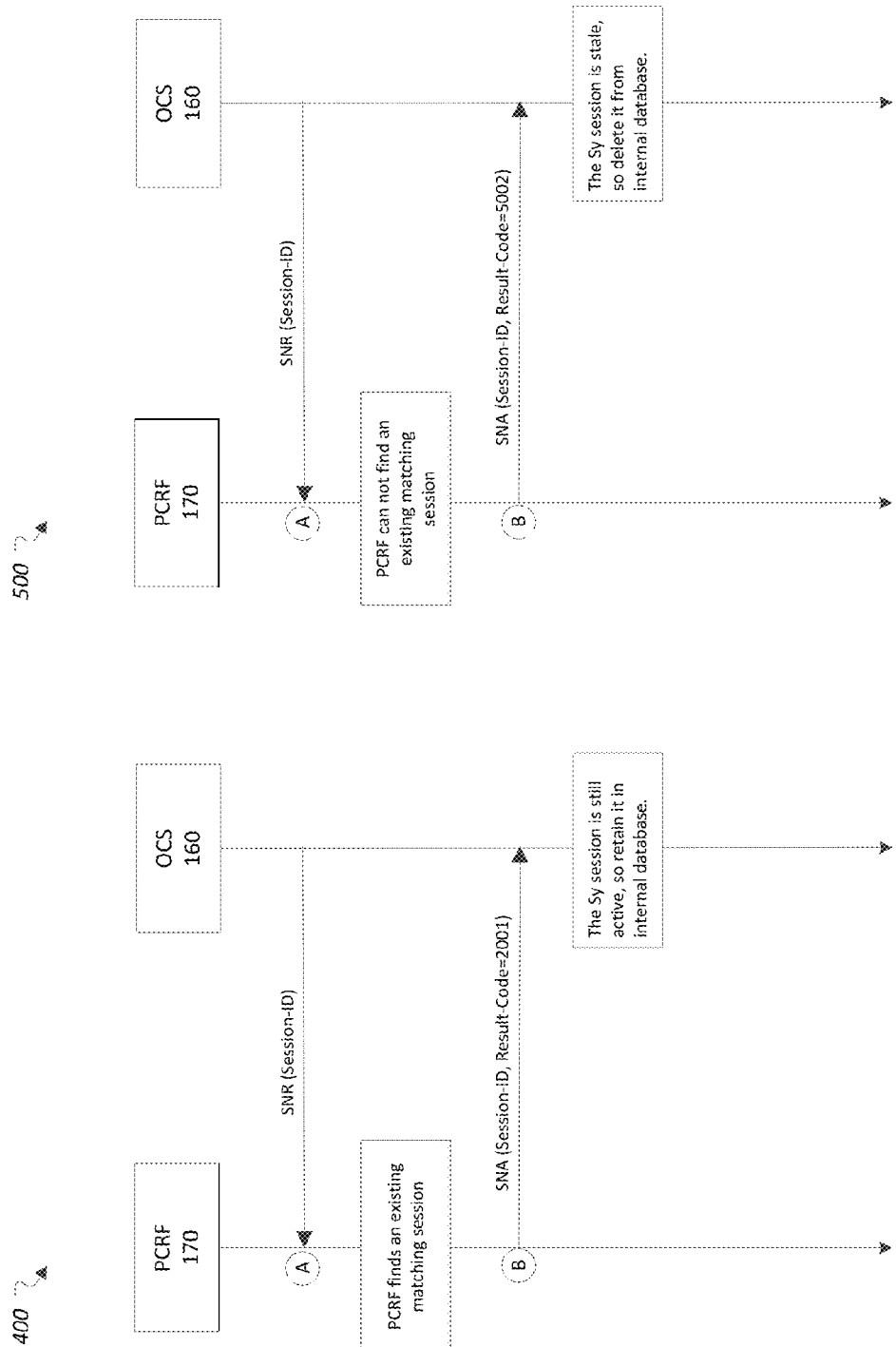
FIG. 4 illustrates an exemplary signaling diagram of the system for termination of a spending limit session in which a spending limit session is active.
FIG. 5 illustrates an exemplary signaling diagram of the system for termination of a spending limit session in which no spending limit session is active.

FIG. 4 illustrates an exemplary signaling diagram 400 of the system 100 for termination of a spending limit session in which a spending limit session is active. For example, based on internal audit criteria, the OCS 160 may send an SNR with no policy-counter-status-report to the PCRF 170 to determine whether one of the Sy sessions stored in its internal database is active or stale. A Sy session may be stale if, for example, the associated user equipment 115 has been turned off or otherwise been detached from the network. At index (A), the OCS 160 may send an SNR to the PCRF 170 including an identifier of the session being queried. The PCRF 170 may then determine whether any such session is available. At index (B), the PCRF 170 may determine that it does have an Sy session associated to the session identifier, and therefore returns an SNA indicative of that result, e.g., result-code 2001 (i.e., DIAMETER_SUCCESS). Based on the SNA, the OCS 160 may accordingly determine that the Sy session is still active, and may retain a record of the session in its records of active sessions.

FIG. 5 illustrates an exemplary signaling diagram 500 of the system 100 for termination of a spending limit session in which no spending limit session is active. As with diagram 400, at index (A), the OCS 160 may send a SNR including an identifier of the session. However, at index (B), the PCRF 170 may determine that it does not have an Sy session associated to the session identifier, and therefore returns an SNA indicative of that result, e.g., result-code 5002 (i.e., DIAMETER_UNKNOWN_SESSION_ID). Based on the SNA, the OCS 160 may accordingly determine that the Sy session is stale, and may delete a record of the session from its records of active sessions.

FIG. 6 illustrates an exemplary process 600 for creating a spending limit session for providing charged data services to user equipment 115. The process 600 may be performed by various devices, such as by a PCRF 170 and an OCS 160 of an EPC 120 controlling access of user equipment 115 to a packet data network 125.

In block 602, the PCRF 170 receives an indication of user equipment 115 connection to a network such as LTE network 105. For example, an item of user equipment 115 may send (e.g., by way of firmware or software of the user equipment 115) an attach request to a base station 110 of the LTE network 105, which may forward the request to the EPC 120 to generate the create session request message directed to a PCEF 145 of a PGW 140 of the system 100. The PCEF 145 may accordingly send a credit control request initiate (CCR-I) message over the Gx interface to the PCRF 170.

In block 604, the PCRF 170 queries for a subscriber profile 155. For example, the PCRF 170 may send a UDR message to a SPR 150 of the system 100 to request a subscriber profile 155 associated with the identity of the user equipment 115, and may receive a UDA response from the SPR 150 including the requested subscriber profile 155.

In block 606, the PCRF 170 creates a spending limit session. For example, for subscribers that use the OCS 160, an Sy session may be created via an SLR/SLA exchange between the PCRF 170 and the OCS 160. Once created, the Sy session may be available to handle later user requests for data services. After block 606, the process 600 ends.

FIG. 7 illustrates an exemplary process 700 for utilizing a spending limit session for providing charged data services to user equipment. As with the process 600, the process 700 may be performed by various devices, such as by a PCRF 170 and an OCS 160 of an EPC 120 controlling access of user equipment 115 to a packet data network 125.

In block 702, the PCRF 170 receives a request from user equipment 115 for data services. For example, the PCEF 145 may request data services, such as by way of sending an Internet or other type of CCR message over the Gx interface to the PCRF 170.

In decision point 704, the PCRF 170 determines whether a spending limit session for the user equipment 115 exists. For example, the PCRF 170 may determine whether it has an active spending limit session (e.g., Sy session) associated with the user equipment 115 (e.g., looked up according to a subscriber identifier or session identifier included in the CCR message). If a spending limit session exists for the user equipment 115, control passes to block 706. Otherwise, control passes to block 708.

In block 706, the PCRF 170 responds to the request for data services using spending limit session rules of the spending limit session. For example, the PCRF 170 may send a CCA-I response over the Gx interface to the PCEF 145 responsive to the spending limit session and including Sy session based PCC rules. After block 706, the process 700 ends.

In block 708, the PCRF 170 responds to the request for data services using default spending limit session rules. For example, PCRF 170 sends a CCA-I response over the Gx interface to the PCEF 145 indicative of the default PCC rules.

In block 710, the PCRF 170 receives an indication of creation of a spending limit session for the user equipment 115. For example, the PCRF 170 may receive a SLA response from the OCS 160 responsive to sending a spending limit request (SLR)-I request to the OCS 160.

In decision point 712, the PCRF 170 determines whether a rule update is required based on the created spending limit session. For example, the PCRF 170 may compare the rules of the created spending limit session to the default rules, and may identify any rule differences that should be addressed. As an example, the created spending limit session may include a lower daily spending limit for a subscriber than that of the default rules. If a rule update is required, control passes to block 714. Otherwise the process 700 ends.

In block 714, the PCRF 170 provides updated rules to the PCEF 145. For example, the PCRF 170 may send a RAR message to the PCEF 145 including the new policy information according to the received SLA. The PCEF 145 may further provide a RAA message to the PCRF 170 indicative of any re-authorization action that may have been taken. After block 714, the process 700 ends.

Variations on the process 700 may be possible. For example, rather than the process 700 ending after one or more of blocks 706, 612 or 714, control instead may pass back to block 702 to wait for receipt of additional user requests for data services.

Figure 8:
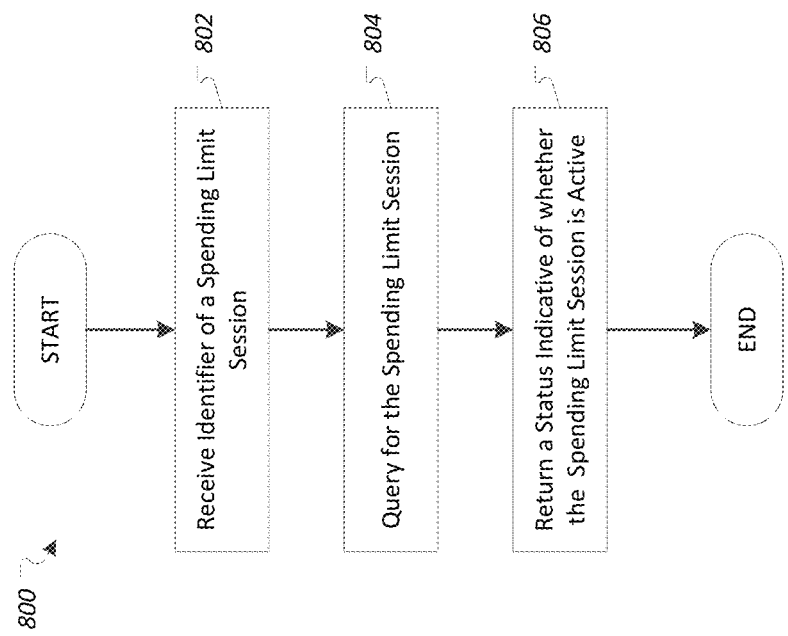
FIG. 8 illustrates an exemplary process for querying the status of a spending limit session.

FIG. 8 illustrates an exemplary process 800 for querying the status of a spending limit session. As with the processes 600 and 700, the process 800 may be performed by various devices, such as by a PCRF 170 and an OCS 160 of an EPC 120 controlling access of user equipment 115 to a packet data network 125.

In block 802, the PCRF 170 receives an identifier of a spending limit session. For example, the requester (e.g., an OCS 160) may send a SNR including an identifier of the session (e.g., Session-ID) to the PCRF 170. In some examples, the requester may periodically send SNRs to the PCRF 170 to allow the requester to update its records of what spending limit sessions may still be active.

In block 804, the PCRF 170 queries for the identified spending limit session. For example, the PCRF 170 may determine whether or not it has an active spending limit session (e.g., Sy session) associated with the identifier of the session.

In block 806, the PCRF 170 returns a status indicative of whether the spending limit session is active. For example, if the PCRF 170 determines that it does have an active session corresponding to the identifier, the PCRF 170 may respond to the SNR with an SNA indicative of that result, e.g., with result-code 2001 (i.e., DIAMETER_SUCCESS). Otherwise, if the PCRF 170 determines that it does not have an active session corresponding to the identifier, the PCRF 170 may respond to the SNR with an SNA indicative of that result, e.g., with result-code 5002 (i.e., DIAMETER_UNKNOWN_SESSION_ID). In some examples, the requester may update its records of what spending limit sessions may still be active based on the SNA result. For instance, based on the result-code returned in the SNA, the OCS 160 may selectively remove record of the queried for spending limit session from its own records. After block 806, the process 800 ends.

Thus, by performing early creation of a spending limit session upon establishment of an initial packet data connection from an item of user equipment 115 (e.g. IMS PDN) rather than waiting for establishment of later PDNs (e.g., Internet PDN), and maintenance of the spending limit session until a last packet data connection of the user equipment 115 has been terminated (e.g., IMS PDN, Internet PDN), the system 100 may be configured to make policy decisions based on subscriber spending limits in a way that does not impact connection time performance baselines (e.g., time to respond to requests for Internet connections). Due to the early creation based on the subscriber profile without waiting to receive a request from the user equipment 115 for data services, upon receipt of a first request for data services by the user equipment 115, in many cases the spending limits associated with the subscriber may already be received by the PCRF 170 and be available for use in policy determinations. Moreover, in cases in which the spending limits associated with the subscriber have not yet been received, the PCRF 170 may utilize default spending limits values to perform an initial policy determination without waiting for creation of the spending limit session, potentially followed up by any necessary corrections to the determination upon later receipt of the actual subscriber information of an identified spending limit session specifically corresponding to the user equipment 115. By way of these enhancements, policy decisions may no longer block waiting on subscriber profiles 155 information maintained by the SPR 150, thereby improving performance baselines for user equipment service requests.

In general, computing systems and/or devices, such as the user equipment 115, SGW 130, PGW 140, SPR 150, OCS 160, and PCRF 170, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the user equipment 115, SGW 130, PGW 140, SPR 150, OCS 160, and PCRF 170 generally include computer-executable instructions, where the instructions may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the SPR 150 storing the subscriber profiles 155, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. In some example, software may be provided that when executed by one or more processors of the computing devices (e.g., the user equipment 115, SGW 130, PGW 140, SPR 150, OCS 160, and PCRF 170) provides the operations described herein. Alternatively, the software may be provided as hardware or firmware, or combinations of software, hardware and/or firmware. For instance, a policy and charging function node 170 of the network may be implemented as a computing device including a processor configured to execute software or firmware instructions stored on a memory of the policy and charging function node 170.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a policy and charging rules function node of a network configured to:
        receive from the network an indication of an element of user equipment connecting to the network,
        in response to receiving the indication, query a subscription profile repository to receive a subscriber profile associated with the user equipment, the subscriber profile including indicators used in the selection of subscriber policies associated with the subscriber, and
        in response to receiving the indication, create a spending limit session based on the subscriber profile without waiting to receive a request from the user equipment for data services.

2. The system of claim 1, wherein the node is further configured to:
    receive the request for data services from the element of user equipment;
    identify that no spending limit session specifically corresponds to the user equipment; and
    respond to the request according to default spending limit rules without waiting for creation of the spending limit session.

3. The system of claim 2, wherein the node is further configured to:
    receive an indication of creation of the spending limit session; and
    provide an update to the response to the request based on differences between the spending limit session and the default spending limit rules.

4. The system of claim 1, wherein the node is further configured to:
    receive the request for data services from the element of user equipment;
    identify the spending limit session specifically corresponding to the user equipment; and
    respond to the request according to spending limit rules of the spending limit session associated with the element of user equipment.

5. The system of claim 4, wherein the node is further configured to:
    receive a second request for data services from the element of user equipment;
    identify the spending limit session specifically corresponding to the user equipment; and
    respond to the second request according to the spending limit rules of the spending limit session associated with the element of user equipment.

6. The system of claim 1, wherein the node is further configured to:
    receive a status query including an identifier of the spending limit session;
    query for the spending limit session according to the identifier of the spending limit session; and return a status indicative of whether the spending limit session is active.

7. The system of claim 1, further comprising an online charging system node configured to:
send a status query including an identifier of the spending limit session to the node;
receive a status indicative of whether the spending limit session is active; and
remove the identifier of the spending limit session from a data store when the status indicates that the spending limit session is no longer active.

8. A method, comprising:
receiving, from a network by a policy and charging rules function node of the network, an indication of an element of user equipment connecting to the network,
in response to receiving the indication, querying a subscription profile repository to receive a subscriber profile associated with the user equipment, the subscriber profile including indicators used in the selection of subscriber policies associated with the subscriber, and
in response to receiving the indication, creating a spending limit session based on the subscriber profile without waiting to receive a request from the user equipment for data services.

9. The method of claim 8, further comprising:
receiving the request for data services from the element of user equipment;
identifying that no spending limit session specifically corresponds to the user equipment; and
responding to the request according to default spending limit rules without waiting for creation of the spending limit session.

10. The method of claim 9, further comprising:
receiving an indication of creation of the spending limit session; and
providing an update to the response to the request based on differences between the spending limit session and the default spending limit rules.

11. The method of claim 8, further comprising:
receiving the request for data services from the element of user equipment;
identifying the spending limit session specifically corresponding to the user equipment; and
responding to the request according to spending limit rules of the spending limit session associated with the element of user equipment.

12. The method of claim 11, further comprising:
receiving a second request for data services from the element of user equipment;
identifying the spending limit session specifically corresponding to the user equipment; and
responding to the second request according to the spending limit rules of the spending limit session associated with the element of user equipment.

13. The method of claim 8, further comprising:
receiving a status query including an identifier of the spending limit session;
querying for the spending limit session according to the identifier of the spending limit session; and
returning a status indicative of whether the spending limit session is active.

14. The method of claim 8, further comprising:
sending, by an online charging system node, a status query including an identifier of the spending limit session to the node;

receiving, by the online charging system node, a status indicative of whether the spending limit session is active; and
removing the identifier of the spending limit session from a data store of the online charging system node when the status indicates that the spending limit session is no longer active.

15. A non-transitory computer readable medium storing an application program, the application program being executable by a node of a communications network to provide operations comprising:
receiving, from the network by a policy and charging rules function node of the network, an indication of an element of user equipment connecting to the network,
in response to receiving the indication, querying a subscription profile repository to receive a subscriber profile associated with the user equipment, the subscriber profile including indicators used in the selection of subscriber policies associated with the subscriber, and
in response to receiving the indication, creating a spending limit session based on the subscriber profile without waiting to receive a request from the user equipment for data services.

16. The non-transitory computer readable medium of claim 15, further providing for operations comprising:
receiving the request for data services from the element of user equipment;
identifying that no spending limit session specifically corresponds to the user equipment; and
responding to the request according to default spending limit rules without waiting for creation of the spending limit session.

17. The non-transitory computer readable medium of claim 16, further providing for operations comprising:
receiving an indication of creation of the spending limit session; and
providing an update to the response to the request based on differences between the spending limit session and the default spending limit rules.

18. The non-transitory computer readable medium of claim 15, further providing for operations comprising:
receiving the request for data services from the element of user equipment;
identifying the spending limit session specifically corresponding to the user equipment; and
responding to the request according to spending limit rules of the spending limit session associated with the element of user equipment.

19. The non-transitory computer readable medium of claim 18, further providing for operations comprising:
receiving a second request for data services from the element of user equipment;
identifying the spending limit session specifically corresponding to the user equipment; and
responding to the second request according to the spending limit rules of the spending limit session associated with the element of user equipment.

20. The non-transitory computer readable medium of claim 15, further providing for operations comprising:
receiving a status query including an identifier of the spending limit session;
querying for the spending limit session according to the identifier of the spending limit session; and
returning a status indicative of whether the spending limit session is active.

* * * * *